US012684675B2

(12) United States Patent
Loccisano

(10) Patent No.: US 12,684,675 B2
(45) Date of Patent: Jul. 14, 2026

(54) INTELLIGENT DARK SKY PARKING AREA WITH DYNAMIC VEHICLE AND LIGHTING CONTROL

(71) Applicant: Vincent Loccisano, Wellesley, MA (US)

(72) Inventor: Vincent Loccisano, Wellesley, MA (US)

( * ) Notice: Subject to any disclaimer, the term of this patent is extended or adjusted under 35 U.S.C. 154(b) by 39 days.

(21) Appl. No.: 18/973,534

(22) Filed: Dec. 9, 2024

(65) Prior Publication Data

US 2025/0106969 A1 Mar. 27, 2025

(51) Int. Cl.

| | |
|---|---|
| ***H05B 47/125*** | (2020.01) |
| ***H05B 47/155*** | (2020.01) |
| ***H05B 47/16*** | (2020.01) |
| ***H05B 47/165*** | (2020.01) |
| ***H05B 47/175*** | (2020.01) |
| ***H05B 47/19*** | (2020.01) |

(52) U.S. Cl.

CPC ......... *H05B 47/125* (2020.01); *H05B 47/155* (2020.01); *H05B 47/16* (2020.01); *H05B 47/165* (2020.01); *H05B 47/19* (2020.01); *H05B 47/1985* (2024.01)

(58) Field of Classification Search

CPC .. H05B 47/115; H05B 47/125; H05B 47/155; H05B 47/16; H05B 47/165; H05B 47/19; H05B 47/1985; B60R 21/13; B60Q 1/24; B60Q 1/247; B60Q 1/249

See application file for complete search history.

(56) References Cited

U.S. PATENT DOCUMENTS

| | | | | |
|---|---|---|---|---|
| 11,472,332 | B1 * | 10/2022 | Salter | B60Q 1/247 |
| 2007/0030136 | A1 * | 2/2007 | Teshima | B60Q 3/80 340/458 |
| 2019/0016254 | A1 * | 1/2019 | Salter | F21V 7/06 |

* cited by examiner

*Primary Examiner* — Thomas M Sember

(74) *Attorney, Agent, or Firm* — Keeley DeAngelo LLP; W Scott Keeley

(57) ABSTRACT

A system and method for increasing safety and efficiency in parking areas uses vehicle-to-vehicle communication, vehicle-to-cellular communication and advanced lighting control to dynamically adjust illumination levels to provide targeted lighting.

8 Claims, 3 Drawing Sheets

INTELLIGENT DARK SKY PARKING AREA WITH DYNAMIC VEHICLE AND LIGHTING CONTROL

TECHNICAL FIELD

The present disclosure relates generally to an automatic lighting system and more specifically to a method and apparatus for controlling the lighting in a parking area to keep lights out when possible.

BACKGROUND OF THE INVENTION

Dark-sky areas, characterized by minimal light pollution, offer unique opportunities for astronomical observation, scientific research and ecological preservation. As artificial light sources continue to proliferate, the number of dark-sky areas is diminishing. The trend has led to concerns about the impact of light pollution on human health, wildlife behavior and the overall quality of life in such areas.

Parking areas, whether in garages, lots, or other structures, traditionally rely on a static system of overhead lighting to ensure visibility. This approach, while effective, often results in excessive energy consumption and light pollution, particularly during nighttime hours when the area may be sparsely populated. Furthermore, such static lighting systems do not adapt to real-time changes in traffic patterns or user needs.

A more dynamic and efficient lighting solution for parking areas would address these limitations. A lighting system capable of automatically adjusting light levels according to the presence and movement of vehicles and pedestrians would provide targeted illumination to specific areas as needed, for instance with guiding vehicles to available parking spaces, or pedestrians to their parked cars.

While existing lighting systems may incorporate sensors to detect occupancy and adjust light levels accordingly, these systems often lack the sophistication to provide real-time, targeted illumination. A system that leverages advanced technologies such as vehicle-to-vehicle communication would create a more intelligent and responsive lighting environment.

SUMMARY OF THE INVENTION

The present invention provides a system and method for increasing safety and efficiency in parking areas. By leveraging vehicle-to-vehicle communication, vehicle-to-cellular communication and advanced lighting control, the system dynamically adjusts illumination levels to provide targeted lighting solutions.

When a vehicle enters a parking area, the system automatically illuminates a path to an available parking space. Vehicle-to-cellular communication may be used to identify the user by way of a smart-phone app, pairing a user with their vehicle. By coordinating the activation of overhead lights with the vehicle's own lighting system, a path to the vehicle may be illuminated while the vehicle lights are turned on. Similarly, pedestrians can trigger the system to illuminate a pathway to their parked vehicle or a specific area of interest within the parking area. Vehicle-to-vehicle communication may be used to assist drivers in finding an open parking spot. Modern vehicles have proximity sensors and cameras that detect vehicles in proximity to assist during a lane change. These same sensors may be employed to detect an empty parking space in the vicinity of the parked vehicle. The parked vehicle may communicate through the smart-phone app to a central control that records the location of the open parking space. When a vehicle enters the parking area, overhead lights illuminate a path to the empty parking space. One skilled in the art understands that vehicle-to-cellular communication may also take place over vehicle-to-internet communication.

This innovative approach offers several benefits, including reduced energy consumption, improved visibility, and enhanced safety for both drivers and pedestrians. By optimizing lighting usage and providing personalized illumination, the system contributes to a more sustainable and user-friendly parking experience.

DETAILED DESCRIPTION

Figure 1:
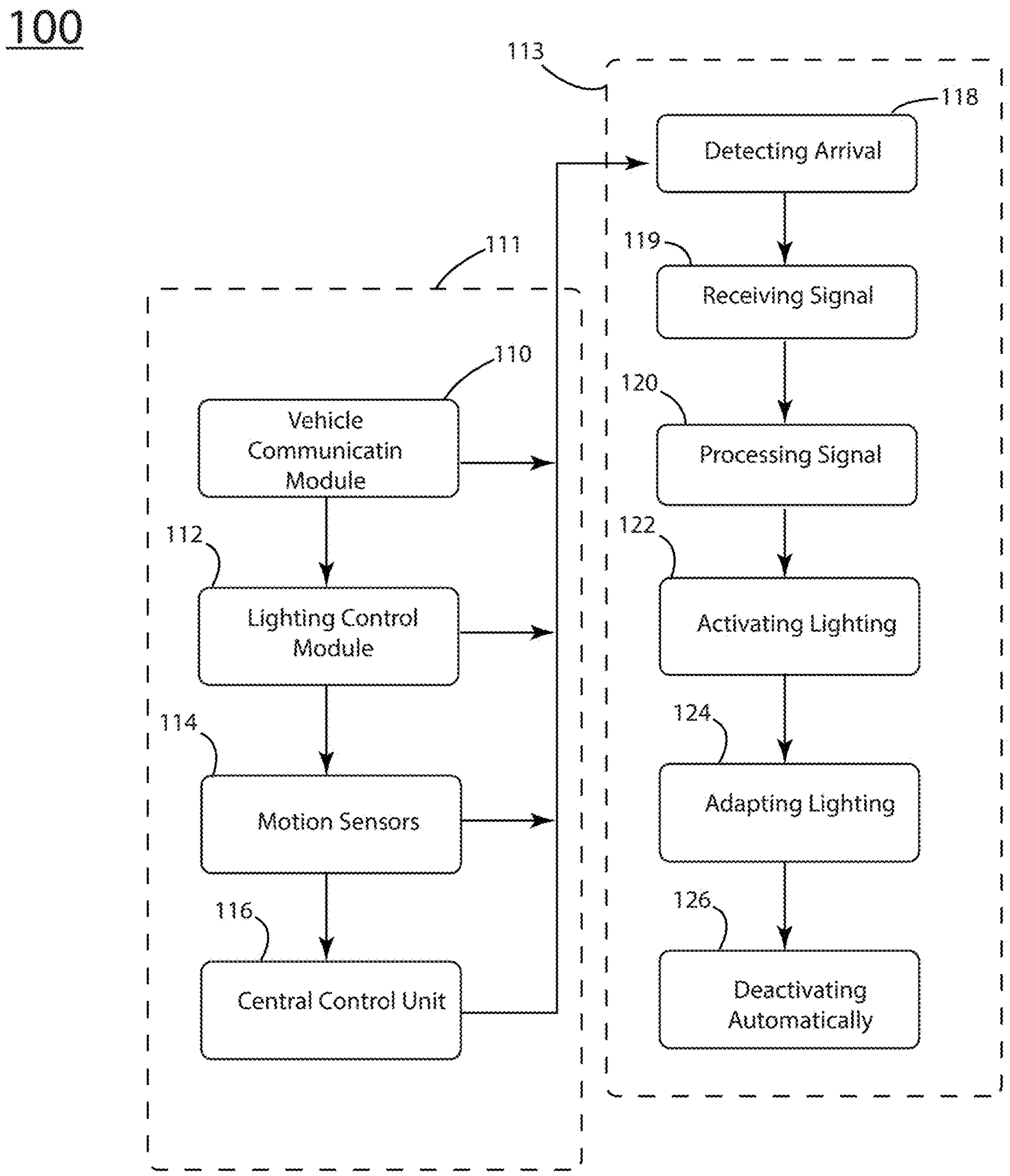
FIG. 1 is a diagram of an example system of the embodiment.

FIG. 1 illustrates the system and components and the operation for vehicle-pathway illumination of an example embodiment. System components are grouped by dashed-line perimeter 111. An example of the embodiment's operation is grouped by dashed-line perimeter 113.

Modern electric vehicles are equipped with a vehicle-communication module 110 that is capable of transmitting and receiving signals from other vehicles as well as signals generated by exterior-control systems such as overhead-lighting control systems. A lighting-control module 112 is integrated into modern electronic vehicle lighting systems as well as to overhead lights. Motion sensors are configured to detect the presence of pedestrian traffic and to send signals to nearby vehicles to activate their lighting systems, as well as to activate overhead lights. A central control unit 116 receives, sends and interprets signals to coordinate communication between vehicle-communication modules 110, lighting-control modules 112 and motion sensors 114. The central control unit processes data from sensors and communication modules to manage parking-area lighting to dynamically illuminate areas in use, leaving dark those areas that are not in use.

Operation of vehicle-pathway illumination is described by items grouped in dashed-line perimeter 113. Upon detecting arrival 118 of a vehicle in a parking area, the vehicle-communication module 110 sends a signal to the central control unit 116. Reception of the signal 119 in the central control unit 116 is followed by processing of the signal 120 by the central control unit 116 as it considers the location and best path for the arriving vehicle to determine an optimal lighting configuration. In some embodiments, the intended path is determined by reviewing received signals from other vehicles' cameras or proximity sensors that recognize empty parking spaces.

In another embodiment, one or more sensors located at a height above the parking area may be employed to determine the existence of available parking spaces. For example, a light tower mounted camera may look downward over the parking area to determine if a vehicle parking space exists between presently parked vehicles. This downward looking camera sensor may use image recognition to determine suitable parking spaces between parking lot lines and may further identify if these spaces are filled or empty. Alternate sensor arrangements such as pavement mounted inductive loops may be used to determine if a space is empty or occupied.

An optimal pathway is mapped between the vehicle location and the empty parking-space location. Lighting is activated 122 as the central control unit 116 sends signals to nearby vehicles and overhead lights to create an illuminated pathway to an available parking space, or to the area surrounding the new arrival. Lighting adapts 124 as the vehicle moves; the central control unit 116 continuously updates lighting configuration to ensure a well-lit path, adjusting the lighting according to real-time data. Automatic deactivation 126 occurs, with lights turned off after a predetermined period of time, or after a vehicle has been parked and motion sensors 114 detect no motion.

Figure 2:
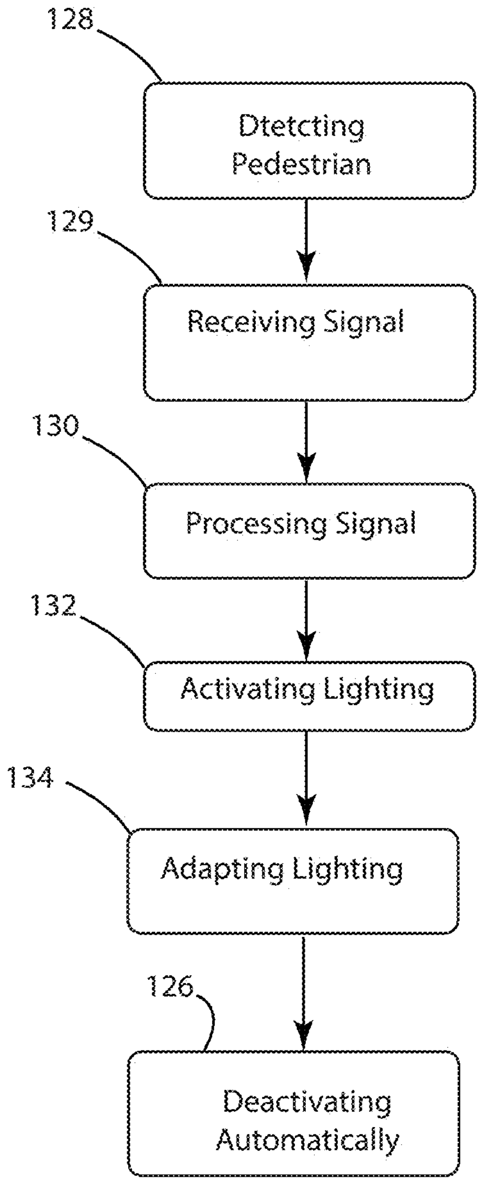
FIG. 2 is a diagram of an example of the control and communications aspect of the embodiment.

FIG. 2 shows an example operation of pedestrian-pathway illumination. A pedestrian is detected 128 upon entering the parking area, engaging motion sensors 114, and sending a signal 116 to the central control unit. When the central control unit receives the signal 129, it process it 130 as it arrives from the motion sensors 114 and then determines an optimal lighting configuration according to the pedestrian's location and intended path. In some embodiments, the intended path is determined by identifying the individual's vehicle, vehicle location and optimal pathway to the vehicle. Activating lighting 132 occurs as the central control unit 116 sends activation signals to nearby vehicles and overhead lights to create an illuminated pathway to the pedestrian's vehicle or the surrounding area. Lighting adapts 134 as the pedestrian moves, and motion sensors 114 continue to send signals to the central control unit 116, which continuously updates the lighting configuration, adjusting light according to real-time data input, to ensure a well-lit path. Automatic deactivation 126 occurs as lights go off after a predetermined period of time or after the vehicle is parked and motion sensors 114 have detected no motion. One skilled in the art understands that a control unit may be based in physical proximity to the parking lot, be cloud based or may be remote from the parking lot and accessed by wired or wireless means.

Figure 3:
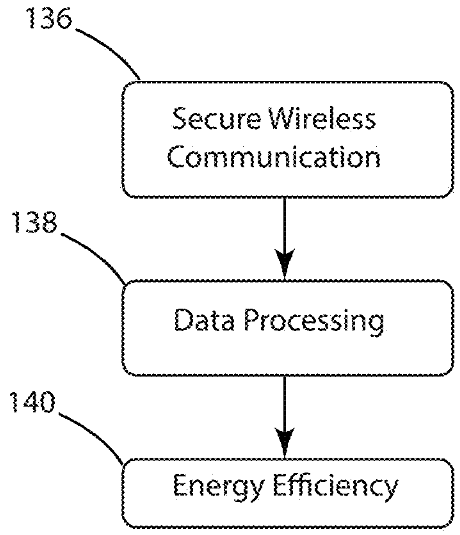
FIG. 3 is a diagram of the control and communication aspect of the embodiment.

FIG. 3 illustrates an example of control communication. Secure wireless communication 136 uses secure wireless-communication protocols to ensure reliable signal transmission between vehicles, overhead lights and sensors. The central control unit 116 processes data 138 from all communication modules and sensors and applies algorithms to manage the dynamic lighting system. Energy efficiency 140 is achieved as the system is designed to minimize energy consumption by activating lights only when needed.

The invention claimed is:

1. A system for illuminating pathways in a dark-sky parking area comprising:

a plurality of vehicles, each comprising an onboard sensor suite including at least one imaging camera and a plurality of proximity sensors, a communication module and a wireless transceiver configured to transmit sensor-derived occupancy data and to receive lighting control commands; and a plurality of motion sensors distributed throughout the parking area and in wireless communication with a central control unit; and a plurality of overhead lights each comprising a wireless control circuit; and the central control unit comprises a processor and a memory containing a spatial map of the parking area, the central control unit being in wireless communication with the wireless transceivers of the plurality of vehicles and the wireless control circuits of the overhead lights; wherein the central control unit is configured to execute instructions to define an illuminated pathway from an arriving vehicle to an empty parking space identified by the sensor-derived occupancy data received from the onboard sensor suites of one or more stationary vehicles; and wherein the overhead lights and a lighting system of the arriving vehicle are synchronized by the central control unit to illuminate only the illuminated pathway.

2. The system of claim 1 wherein:

the vehicle communication modules' sensor-derived occupancy data includes information denoting the presence of one or more vehicles in the parking area, causing the central control unit to activate nearby vehicle and overhead lights to create an illuminated pathway.

3. The system of claim 1 wherein:

signals from the motion sensors include information denoting the presence of one or more pedestrians, causing the central control unit to activate nearby vehicle and overhead lights to create an illuminated pathway to the pedestrian's vehicle.

4. The system of claim 1 wherein:

the central control unit continuously updates the lighting configuration based on real-time data to ensure a well-lit path for both vehicles and pedestrians.

5. The system of claim 1 wherein:

vehicle and overhead lights are turned off automatically after a predetermined period once the vehicle has parked or the pedestrian has reached their vehicle.

6. The system of claim 1 wherein:

the central control unit and communication modules use secure wireless communication protocols to ensure reliable signal transmission and minimize interference.

7. A method for operating the system of claim 1, the method comprising:

detecting the arrival of at least one vehicle; and receiving a signal in the central control unit; and processing the signal; and activating lighting; and adapting lighting to accommodate the movement of the at least one vehicle; and deactivating lighting when the at least one vehicle is parked and the driver has left the vicinity; and repeating the method.

8. A method for operating the system of claim 1, the method comprising:

detecting the arrival of at least one pedestrian; and receiving a signal in the central control unit; and processing the signal; and activating lighting; and adapting lighting to accommodate the movement of the at least one pedestrian; and deactivating lighting when the at least one pedestrian has been led to their vehicle and left the vicinity.

* * * * *